Feb. 23, 1932.　　　　E. C. HEAD　　　　1,846,640
HOB
Filed May 16, 1928　　　2 Sheets-Sheet 1
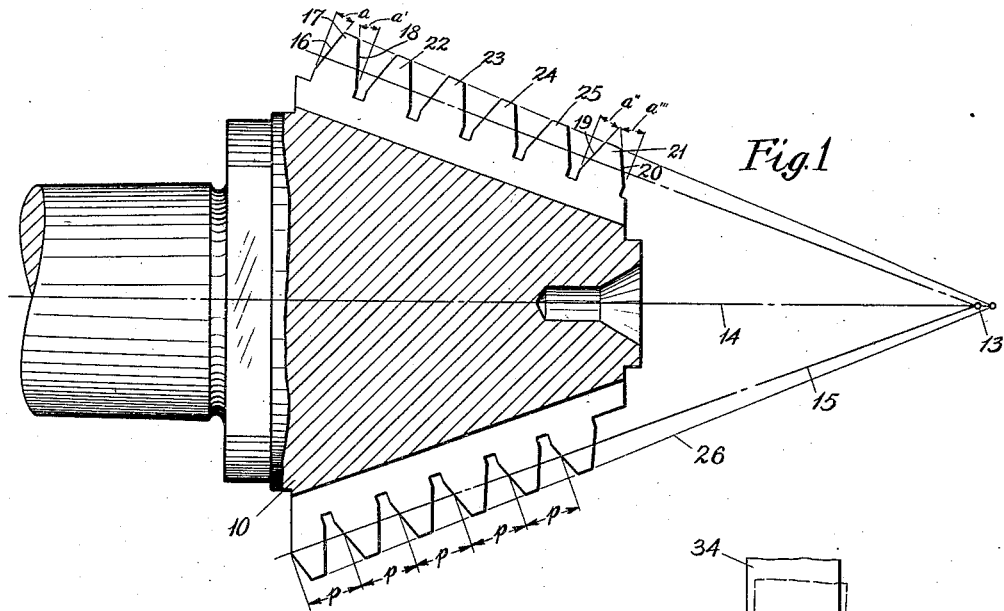
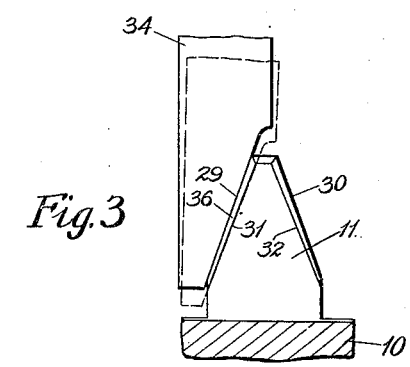
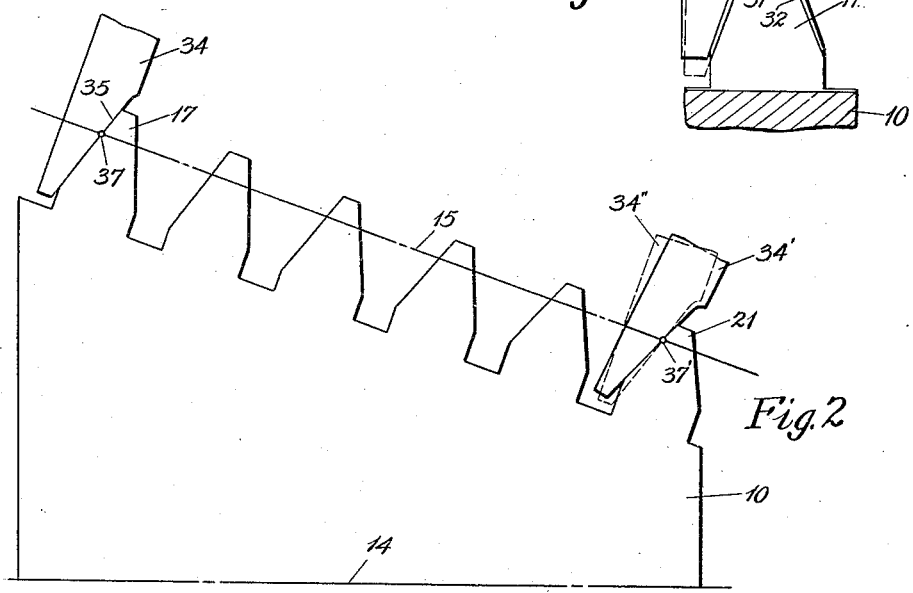
INVENTOR
*Ernest C. Head*
BY *B. Schlesinger*
ATTORNEY Feb. 23, 1932.  E. C. HEAD  1,846,640
HOB
Filed May 16, 1928  2 Sheets-Sheet 2

INVENTOR.
Ernest C. Head
BY
his ATTORNEY.

Patented Feb. 23, 1932

1,846,640

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

HOB

Application filed May 16, 1928. Serial No. 278,208.

The present invention relates to gear cutting hobs and particularly to hobs for cutting spiral bevel gears.

One object of this invention is to provide a hob, the cutting edges of which will have the same effective pressure angle after sharpening as the cutting edges of the hob when new.

A further object of this invention is to provide a hob for cutting properly proportioned teeth of tapering depth on tapered gears. With the hob of the present invention, a bevel or hypoid gear can be cut the teeth of which will be of substantially uniform pressure angle from end to end measured circumferentially of the gear so that the gear will be stronger than previous forms of hobbed tapered gears.

A still further object of this invention is to provide a taper hob which will be stronger and which will have teeth at the small end of the hob stronger than taper hobs of previous constructions.

Another object of this invention is to provide a taper hob which is practical to relieve and to relief grind.

Other objects of the invention will be apparent hereinafter from the specification and from the appended claims.

In the drawings:

Figure 1 is an axial sectional view of a taper hob constructed according to this invention;

Figure 2 is a diagrammatic view illustrating the method of relieving this hob;

Figure 3 is a diagrammatic view illustrating the relative movement between the relieving tool and the hob blank during the relieving of one of the teeth of the hob;

Figure 4:
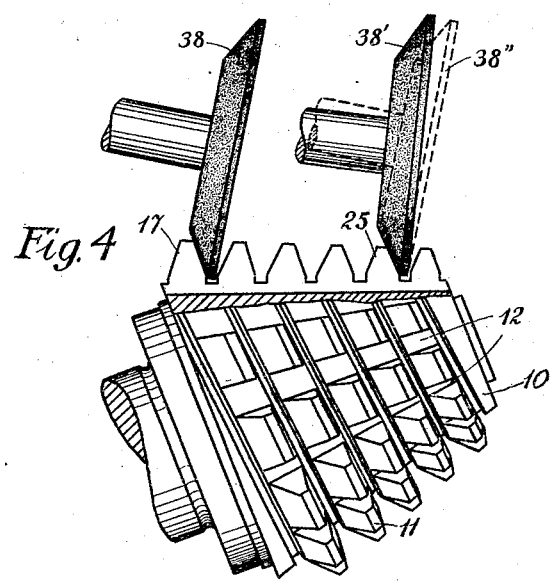
Figure 5:
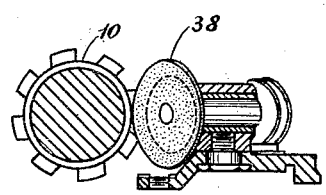

Figure 4 is a side elevation, partly in section, of a taper hob constructed according to this invention and illustrating diagrammatically the method of relief grinding the same; and Figure 5 is a section through the hob on a smaller scale, taken in a plane perpendicular to the hob axis and showing more particularly one form of grinding attachment for relief grinding a hob according to this invention.

The cutting edges of a worm hob are arranged in a helical thread and are formed by gashing and relieving this thread. The prior practice has been to relieve the teeth of a hob so that the relieved side faces are of the same pressure angle from front to rear. After such a hob has been sharpened, however, the new cutting edges will occupy different positions along the helix from the old cutting edges with the consequence that being of the same pressure angle as the original cutting edges their cutting action will be different from the cutting action of the original cutting edges. While the pressure angles of the original cutting edges were correct for producing a gear of a desired pressure angle, the pressure angles of the new cutting edges will not be correct for producing the same gear. With the present invention, however, the pressure angles of the relieved side faces of the hob teeth are varied in such wise from front to rear of the teeth that after the hob has been sharpened, the new cutting edges will have pressure angles determined by their position along the helix, which are exactly suited to cut a gear of the pressure angle which the hob was originally intended to cut. This result is attained by tilting the relieving tool continuously during the relieving of each tooth of the hob to vary continuously the inclination of the cutting edge of the tool relative to the tooth side face being relieved thereby to vary the pressure angle of the side face of the tooth continuously from front to rear of the tooth. One accomplishment of the present invention, therefore, is to provide a hob which will have the same effective cutting action after sharpening as it did originally.

The present invention has for its object also the provision of a more practical form of taper hob for hobbing spiral bevel gears and tapered gears generally. By this invention, such a hob may be provided with teeth of continuously increasing pressure angle from the large to the small end of the hob, with the consequence that the teeth at the small end of the hob will be much stronger than in taper hobs as heretofore constructed. This is accomplished by tilting the relieving tool continuously as it moves from the large to the small end of the hob so as to continuously increase the inclination of the cutting edge of the relieving tool relative to the side faces of the hob teeth being relieved. The pitch of the hob thread can be maintained constant on the pitch, roof, top or any intermediate surface as desired, by tilting the tool during its longitudinal movement about points lying in any one of these surfaces. With the present invention, therefore, a hob may be produced, the cutting edges of which are of varying pressure angle from end to end of the hob and the teeth of which have side cutting faces of varying pressure angle from front to rear and which at the same time will be capable of cutting taper gears according to existing methods.

Referring now to the drawings by numerals of reference, in Figs. 1 and 4, I have shown a taper hob 10, constructed according to one embodiment of my invention, for hobbing spiral bevel gears. This hob is shown in axial section in Fig. 1 and in elevation with a portion broken away to show an axial section in Fig. 4. The hob is provided with a plurality of cutting teeth designated generally at 11 which are formed by gashing at suitable intervals a conical thread and then relieving the portions of the thread back of the gashes or flutes to form cutting edges.

The gashes or flutes 12 are straight in the hob 10 illustrated but they may be curved, as will be understood. The apex of the hob is indicated at 13 and its axis at 14, while 15 designates its pitch surface. The pressure angles of the hob teeth vary continuously from one end to the other of the hob, preferably increasing toward the small end of the hob. Thus the pressure angle $a$ of the cutting edge 16 of the hob tooth 17 is less than the pressure angle $a'$ of the opposite side cutting edge 18 of this same tooth and these two pressure angles are in turn less than the pressure angles $a''$ and $a'''$ of the corresponding side cutting edges 19 and 20 of the hob tooth 21 at the small end of the hob. The pressure angles of the cutting edges of the teeth 22, 23, 24 and 25 intermediate the teeth 17 and 21 increase over the pressure angles of the cutting edges 16 and 18 in proportion to their positions along the hob, the hob having cutting edges of continuously increasing pressure angles from one end to another and the pressure angle of any one cutting edge depending upon its position in the hob thread.

Each tooth of the hob is preferably so relieved that the pressure angles of its side faces will vary from front to rear of the tooth. In other words, the side face of the hob tooth has, measured from front to rear, a constantly changing inclination to the axis of the hob. The profile of the tooth at the front of the tooth has one inclination to the axis of the hob and at the rear of the tooth a different inclination. This is illustrated in Figure 3 in which one tooth of the hob is shown. As will be seen, the pressure angles of the front cutting edges 29 and 30 of the teeth differ from, being less than, the pressure angles of the rear edges 31 and 32. The sides of the tooth have, measured from front to rear, a changing inclination to the axis of the hob, the profiles 31 and 32 being differently inclined to the axis of the hob from the profiles 29 and 30. The pressure angles of the side faces change along the tooth just so much as is compatible with the changing positions of lines in these faces along the thread helix of the hob. By making the teeth of the hob in this way, when the hob is sharpened the new cutting edges will have such pressure angles suited by reason of their changed position on the helix of the hob to take the same cut as the original cutting edges. While the provision of teeth having side tooth surfaces of varying pressure angles from front to rear is of especial advantage in a hob of the type shown where the pressure angles of the cutting edges vary continuously from one end of the hob to the other, this feature of the present invention is applicable to any form of hob having its cutting edges arranged in a continuous thread as by forming the teeth of such a hob with side faces of varying pressure angles from front to rear, the hob will always do the same work no matter how much it be sharpened.

In hobbing spiral bevel gears, a certain relationship exists always between the hob and the crown gear or other basic gear to which the teeth of the bevel gear are to be generated conjugate. One purpose of the present invention is to provide an improved form of hob for cutting spiral bevel gears. This purpose is achieved by increasing the pressure angles of the teeth and decreasing their height as they aproach the small end of the hob whereby a hob of increased strength is secured and one capable of cutting properly proportioned teeth of tapering depth on a tapering gear blank. With this invention it is possible at the same time also to construct the hob so as to permit employing any previous system of hobbing spiral bevel gears. In the patents to Taylor No. 1,618,240 of February 22, 1927 and to Trbojevich Reissue No. 16,173, September 22, 1925, for instance, taper hobs of constant axial pitch are employed as the cutting tools and there exists in each case a certain relationship between the hob and the crown gear of the system such that when the hob is positioned in a specified manner relative to the blank and rotated in engagement with the blank while simultaneously producing a relative rolling movement between the hob and blank, a bevel gear can be cut conjugate to the basic crown gear. The same relationship can be maintained and the same general method of cutting employed with a hob constructed according to the present invention. Thus it is possible to produce a hob, the cutting edges of which are of varying pressure angle from one end of the hob to the other but which nonetheless is of constant pitch in axial section on its pitch surface. In development, then, the same relationships described by Taylor and Trbojevich between the hobs illustrated in their patents and their basic crown gears can be maintained with a hob constructed according to the present invention. So the hob 10 may be of constant pitch $p$ in axial section measured on its pitch surface 15. The increase in pressure angle of the cutting edges from the large to the small end of the hob has already been described. The taper in height of the teeth from the large to the small end referred to above is obtained by turning the hob off to a cone angle larger than its pitch cone angle. This is illustrated clearly in Figure 1 where it will be seen that the top cone surface 26 is of larger cone angle than its pitch cone surface 15 with the consequence that the teeth of the hob will decrease in height gradually from the large to the small end.

Having described the new form of hob and one embodiment of it specifically, I will next describe generally the method of making this hob.

A thread is first turned up on the hob blank and this thread is gashed or fluted at intervals as usual to provide cutting teeth. The hob blank is then mounted in the relieving lathe and the teeth are relieved according to a new process constituting one feature of this invention. In the relieving operation, in addition to the usual motions employed comprising a relieving movement between the relieving tool and the hob blank, the blank rotation and the relative motion between tool and work longitudinally of the hob blank, there is imparted an added motion in which the relieving tool is tilted continuously relative to the side face of each hob tooth being relieved as the tool moves in its relieving motion from front to rear of the tooth and in which when a taper hob for cutting tapered gears is to be produced, this tilting movement is made continuous during the relative movement of the tool from one end of the hob to the other. Through the varying inclination of the cutting edge of the relieving tool to the tooth face of the hob, tooth faces will be produced on the hob having varying pressure angles from front to rear and the hob will be of varying pressure angle from one end to the other as described.

Figures 2 and 3 illustrate the relieving of one side face of the thread of a hob such as shown in Figure 1 and Figures 3 and 4 the relief grinding of the opposite side face of the thread of this hob. As the hob 10 rotates on its axis, the relieving tool 34 is given continuously a relieving motion which causes the tool to move toward the hob blank as shown in Figure 3, during the passage of each tooth 11 of the blank under the tool. Simultaneously a relative movement is imparted between the relieving tool and the blank which causes the tool to travel continuously longitudinally of the blank. After each tooth has been relieved, the tool 34 is quickly withdrawn preparatory to the relieving of the next tooth as that tooth moves into position by reason of the continued rotation of the hob blank and the continuous relative longitudinal movement between the hob and blank. With the present invention in addition to these usual motions, there is imparted a tilting motion to the tool which causes the cutting edge 35 of the tool to vary its position continuously during the relieving of each tooth of the hob and as the tool moves longitudinally of the hob.

Figure 3 shows in full lines and in dotted lines two positions assumed by the relieving tool 34 as it relieves the side tooth surface 36 of the tooth 11. The movement of the tool toward the blank as the tooth 11 passes under it provides the necessary side clearance for cutting and the tilting of the tool during this movement provides the tooth face 36 with a continuously varying pressure angle from front to rear of such amount that after the hob tooth is sharpened, the new cutting edges will have pressure angles varied just enough from the pressure angles of the original cutting edges to compensate for the changed position of the cutting edges in the helical surface of the hob thread.

The tilting motion imparted to the relieving tool is made continuous as the tool moves from one end of the hob blank to the other so that the inclination of the side cutting edge 35 of the tool relative to the side faces of the hob teeth being relieved varies continuously as the tool moves longitudinally of the hob. In this way, the side tooth surfaces are produced on the hob which are of continuously varying pressure angles from one end of the hob to the other, as described.

In producing a taper hop for the purpose of cutting spiral bevel gears, the pressure angle of the hob is preferably increased from the large to the small end of the hob so as to provide teeth at the small end of the hob of increased strength over taper hobs of previous constructions. In Figure 2, 34 indicates the position of the relieving tool during relieving of the tooth 17 of the hob 10 and 34 indicates the position that the tool has assumed because of its continuous tilting motion during relieving of the tooth 21 of the hob. As is clear, the inclination of the cutting edge 35 of the tool to the hob thread has been increased with the consequence that the tooth 21 will have a side cutting edge 19 of increased pressure angle as compared with the pressure angle of the side cutting edge 16 of the tooth 17.

For the purpose of comparison the position of the tool relative to the blank when relieving the tooth 17 is shown in dotted lines at 34'' at the right hand side of Fig. 2 to indicate how the tool has been tilted continuously to the position 34' which it has assumed when relieving the tooth 21. As will be understood, the tilting motion of the tool is continuous as the tool moves longitudinally of the hob so that the pressure angles of corresponding side cutting edges of the hob vary continuously from one end of the hob to the other.

By tilting the relieving tool about points 37, 37', etc. lying on the pitch surface 15 of the hob, the pitch $p$ of the hob can be made constant or uniform as illustrated in Figure 1.

It will be understood that the opposite side cutting edges 18 etc. of the hob teeth may be relieved by substituting for the tool 34, a tool suitable for relieving the opposite side face of the hob thread, and by imparting the movements already described as being used in relieving with the tool 34.

The same relative motions already described are employed in relief grinding the hob to produce a finished tool. One advantage of the new form of hob is that it can be relief ground with a disc grinding wheel. Such a wheel has a longer life, is easier to dress and maintain accurate, and hence is cheaper than the pencil grinding wheels which it has been necessary to employ heretofore in relief grinding taper hobs. Due to the increased pressure angle of the hob teeth at the small end, there is plenty of clearance for a disc grinding wheel, whereas with hobs of constant pressure angle as heretofore constructed there was insufficient clearance for such a wheel and only pencil grinding wheels could be successfully employed to relief grind. During relief grinding the grinding wheel 38, which is preferably in the form of a conical wheel, is rotated on its axis continuously by any suitable means, the hob 10 is rotated on its axis and a continuous relieving movement is imparted between the grinding wheel 38 and the hob while the wheel is moved longitudinally of the hob. At the same time the wheel is tilted continuously relative to the side of the hob thread being relieved to vary the pressure angle of the hob teeth from front to rear and from one end of the hob to the other. 38 indicates one position of the grinding wheel during relief grinding of one side face of the tooth 17 and 38' indicates the position the grinding wheel has assumed when grinding the corresponding side face of the tooth 25. The dotted line position 38'' is the position which the grinding wheel had originally at 38 and indicates how much the grinding wheel is tilted during its movement longitudinally of the hob from the tooth 17 to the tooth 25.

By adjusting the grinding wheel end for end, it can be made to relief grind the other side of the hob thread.

While the invention has been described in connection with a hob and the production of a hob which possesses jointly the features of variation in pressure angle of the cutting edges from end to end of the hob and variation in pressure angle of the side faces of the teeth from front to rear, it is to be understood that it is within the contemplation of this invention, also, to employ these features independently of each other if desired. Thus it is within the scope of this invention to provide hobs having teeth whose side surfaces are of varying pressure angle from front to rear which do not have cutting edges of varying pressure angle from one end to the other or vice versa to provide hobs having teeth whose cutting edges are of varying pressure angle from end to end whose side faces are provided initially with a constant pressure angle from front to rear.

Moreover, while I have described the invention in connection with the relieving of a hob for cutting spiral bevel gears and in connection with a particular form of hob for this purpose, it is to be understood that the invention is applicable to the manufacture of other forms of hobs and for other purposes as for hobbing hypoid or spur or worm gears, etc. The method in which the particular form of hob illustrated is employed for cutting spiral bevel gears and taper gears generally is described more fully in a separate copending application, Serial No. 278,209 filed May 16, 1928.

In general, while I have described my invention in connection with specific embodiments it will be understood that this invention is capable of various further modifications without departing from the scope of the invention and that this application is intended to cover any adaptations, uses, or embodiments of my invention, following, in general, the principles of the invention and including such departures from the present disclosure as come within known or customary practice in the art and as may be applied to the essential features hereinbefore set forth and as fall within the scope of the invention or the limits of the appended claims.

Having thus described my invention, what I claim is:

1. A hob having a plurality of helically arranged finish cutting teeth, the side faces of which are from front to back of changing inclination to the axis of the hob.

2. A taper hob having a plurality of helically arranged finish cutting teeth, the side faces of which are from front to back of changing inclination to the axis of the hob.

3. A hob having a plurality of finish cutting teeth arranged in a thread which is of constant pitch measured on the pitch surface of the hob, said teeth having side faces which are from front to back of changing inclination to the axis of the hob.

4. A hob for cutting tapered gears having a plurality of finish cutting teeth arranged in a thread of a plurality of convolutions, the side cutting edges of which are of continuously varying pressure angle from one end to the other of the hob.

5. A taper hob for cutting tapered gears having a plurality of finish cutting teeth arranged in a thread of a plurality of convolutions, the side cutting edges of which are continuously varying pressure angle from one end to the other of the hob.

6. A taper hob for cutting tapered gears having a plurality of helically arranged finish cutting teeth, the side cutting edges of which are of continuously increasing pressure angle from the large to the small end of the hob.

7. A taper hob for cutting tapered gears having a plurality of helically arranged finish cutting teeth which increase in height from one end of the hob to the other, corresponding side cutting edges of said teeth being of continuously varying pressure angle from one end of the hob to the other.

8. A hob for cutting tapered gears having a plurality of helically arranged finish cutting teeth, the side faces of which are from front to back of changing inclination to the axis of the hob, corresponding side cutting edges of the teeth being of varying pressure angle from one end of the hob to the other.

9. A taper hob for cutting tapered gears having a plurality of helically arranged finish cutting teeth, the side faces of which are from front to back of changing inclination to the axis of the hob, corresponding side cutting edges of the teeth being of varying pressure angle from one end of the hob to the other.

10. A taper hob for cutting tapered gears having a plurality of side cutting edges arranged in a thread which in an axial plane is of constant pitch measured on the pitch surface of the hob, corresponding side cutting edges being of continuously varying pressure angle from one end of the hob to the other.

11. A hob having a plurality of helically arranged finish cutting teeth, the side faces of which have a constantly changing inclination to the axis of the hob from front to back.

12. A taper hob having a plurality of helically arranged finish cutting teeth, the side faces of which have a constantly changing inclination to the axis of the hob from front to back.

13. A hob having a plurality of finish cutting teeth arranged in a thread which in an axial plane is of constant pitch measured on the pitch surface of the hob, said teeth having side faces which are from front to back of changing inclination to the axis of the hob.

14. A taper hob having a plurality of finish cutting teeth arranged in a thread which in an axial plane is of constant pitch measured on the pitch surface of the hob, said teeth having side faces which are from front to back of changing inclination to the axis of the hob.

15. A hob for cutting tapered gears having a plurality of side cutting edges arranged in a thread which is of constant pitch measured on the pitch surface of the hob, corresponding side cutting edges of the teeth being of continuously varying pressure angle from one end of the hob to the other.

16. A hob for cutting tapered gears having a plurality of side cutting edges arranged in a thread which in an axial plane is of constant pitch measured on the pitch surface of the hob, corresponding side cutting edges being of continuously varying pressure angle from one end of the hob to the other.

17. A taper hob for cutting tapered gears having a plurality of side cutting edges arranged in a thread which in an axial plane is of constant pitch measured on the pitch surface of the hob, corresponding side cutting edges being of continuously increasing pressure angle from the large to the small end of the hob.

18. A taper hob for cutting tapered gears having a plurality of helically arranged finish cutting teeth, which increase in height from the small to the large end of the hob, corresponding side cutting edges of said teeth being of continuously increasing pressure angle from the large to the small end of the hob.

19. A taper hob for cutting tapered gears having a plurality of side cutting edges arranged in a thread which in an axial plane is of constant pitch measured on the pitch surface of the hob, said teeth decreasing in height from the large to the small end of the hob and being provided with side cutting edges which are of continuously increasing pressure angle from the large to the small end of the hob.

20. A taper hob for cutting tapered gears having a plurality of helically arranged finish cutting teeth, the side faces of which are from front to back of changing inclination to the axis of the hob, corresponding side cutting edges of the teeth being of constantly increasing pressure angle from the large to the small end of the hub.

21. A taper hob for cutting tapered gears having a plurality of finish cutting teeth arranged in a thread which in an axial plane is of constant pitch measured on the pitch surface of the hob, said teeth each having side faces which are from front to back of constantly changing inclination to the axis of the hob, corresponding side cutting edges of the teeth being of varying pressure angle from one end of the hob to the other.

22. A taper hob for cutting tapered gears having a plurality of finish cutting teeth arranged in a thread which in an axial plane is of constant pitch measured on the pitch surface of the hob, each of said teeth having side faces which are of constantly changing inclination to the axis of the hob from front to back, corresponding side cutting edges of the teeth being of constantly increasing pressure angle from one end of the hob to the other.

23. A hob having a plurality of finish cutting teeth arranged in a plurality of convolutions, said teeth having side faces which from front to back are of changing inclination to the axis of the hob.

24. A hob having a plurality of finish cutting teeth arranged in a thread of a plurality of convolutions, corresponding side cutting edges of said teeth being of constantly varying pressure angle from one end of the hob to the other.

25. A hob having a plurality of finish cutting teeth arranged in a thread of a plurality of convolutions, corresponding side cutting edges on the two sides of said teeth being of constantly varying pressure angle from one end of the hob to the other.

26. A taper hob having a plurality of finish cutting teeth arranged in a thread of a plurality of convolutions, corresponding side cutting edges of said teeth being of continuously increasing pressure angle from the large to the small end of the hob.

27. A taper hob having a plurality of finish cutting teeth arranged in a thread of a plurality of convolutions which in an axial plane is of constant pitch measured on the pitch surface of the hob, corresponding side cutting edges of said teeth being of continuously increasing pressure angle from the large to the small end of the hob.

28. A taper hob having a plurality of finish cutting teeth arranged in a thread of a plurality of convolutions, said teeth having side faces which from front to back are of changing inclination to the axis of the hob, corresponding side cutting edges of said teeth being, also, of constantly increasing pressure angle from the large to the small end of the hob.

ERNEST C. HEAD.